(12) United States Patent
Sambrook

(10) Patent No.: US 7,913,927 B2
(45) Date of Patent: *Mar. 29, 2011

(54) FUEL ECONOMIZER

(76) Inventor: James Edward Sambrook, Hampshire (GB)

( * ) Notice: Subject to any disclaimer, the term of this patent is extended or adjusted under 35 U.S.C. 154(b) by 426 days.

This patent is subject to a terminal disclaimer.

(21) Appl. No.: 12/181,339

(22) Filed: Jul. 29, 2008

(65) Prior Publication Data

US 2010/0025484 A1    Feb. 4, 2010

(51) Int. Cl.
*G05D 23/32* (2006.01)
*F24H 9/20* (2006.01)
*F24F 11/04* (2006.01)

(52) U.S. Cl. .................. 236/46 E; 236/11; 165/247

(58) Field of Classification Search ............... 236/46 R, 236/46 E, 47, 11; 165/244, 247, 267
See application file for complete search history.

(56) References Cited

U.S. PATENT DOCUMENTS

| 4,136,730 A | 1/1979 | Kinsey |
| 4,369,916 A | 1/1983 | Abbey |
| 4,408,711 A | 10/1983 | Levine |
| 4,667,874 A | 5/1987 | Johnson et al. |
| 4,842,044 A | 6/1989 | Flanders et al. |
| 2010/0025489 A1* | 2/2010 | Sambrook ................. 237/8 A |

* cited by examiner

*Primary Examiner* — Chen-Wen Jiang
(74) *Attorney, Agent, or Firm* — Louis Ventre, Jr.

(57) ABSTRACT

An electronic circuit for a hot water heating system conserves fuel consumption and reduces carbon dioxide emissions. A heating system includes a burner that heats water and a room thermostat. The electronic circuit comprises an override thermostat which has a setting for a lower temperature limit and an upper temperature limit below those of the room thermostat. The override thermostat is operable to activate continuous operation of the burner when the indoor temperature falls below the lower temperature limit of the override thermostat and until the upper temperature limit of the override thermostat is reached. The electronic circuit further comprises a timer operable to deactivate and reactivate the burner while the room thermostat is calling for heat.

3 Claims, 1 Drawing Sheet

FUEL ECONOMIZER

TECHNICAL FIELD

In the field of heat exchange, a device is disclosed to increase the efficiency of a heating system in transferring heat using an auxiliary thermostat and timer to create additional temperature cycles for the heat exchanger.

BACKGROUND OF THE INVENTION

A typical heating cycle of a hot-water heating system (sometimes referred to as a hydronic heating system) is controlled by a room thermostat. The room thermostat has settings for upper and lower temperature limits. When the indoor air temperature reaches the upper limit, the room thermostat shuts the boiler burner down and when the indoor air temperature reaches the lower limit, it brings the burner on again. The boiler burner is interchangeably referred to herein as a burner or a boiler.

An example of a typical heating cycle includes the room thermostat set for an indoor air temperature of 21° C. The burner cuts in at an indoor air temperature of 20.5° C. and out at 21.5° C. Thus, the indoor air temperature is controlled at 21° C. plus or minus 0.5° C. With this method of working, the burner is on all the time the room thermostat is calling for heat and off when it is not. An example of a winter heating cycle is one that would require the burner to be on for 12 minutes and off for 12 minutes.

Energy losses in a home heating system are due to heat exchange inefficiency and heat-transfer inefficiency. "Heat exchange" as used herein refers to the exchange of heat between the burner and the circulating water. "Heat transfer" as used herein refers to the transfer of heat from the circulating water to the indoor air.

The improvement in heat exchange efficiency afforded by this invention is also applicable to other types of heating systems including forced air heating. However the improvement in heat transfer efficiency also afforded by this invention cannot be applied to heating systems other than hot-water heating systems where the means of heat transfer is not by circulating hot water. With hot-water systems, any heat not transferred from the water to the indoor air is returned to the boiler. With forced air systems, the air passing through the heat exchanger is delivered directly into the living space and therefore not returned via a closed system.

In-situ testing with this invention has shown fuel savings of as much as 50%. Some of these savings are due to improved heat exchange efficiency but a large proportion is due to improved heat transfer efficiency.

Standing losses of energy in the heat exchange process occur during the rest period (burner-off phase) of each cycle when the room thermostat is not calling for heat. When the boiler burner and the circulating water pump are turned off by the room thermostat after satisfying a heat demand, the heat exchanger cools down by dissipating the residual heat in the water and the heat exchanger via the chimney. The dissipating heat, or lost heat, is known as standing losses.

With some boilers the circulating water pump stops at the same time as the burner resulting in none of the standing losses being reclaimed. With other boilers the pump continues running for a short period after the burner has stopped, during which time some of the residual heat in the heat exchanger is reclaimed and passed on to the indoor air.

When the burner comes on at the start of each cycle, the temperatures of both the water and the heat exchanger are initially low. The rates of heat absorbed by the water and the heat exchanger therefore start off high but taper off until maximum temperatures are reached. This phase of the heating cycle is herein referred to as the initial heating period. At this point, second phase heating follows when the temperature of the heat exchanger and the rate of heat absorbed by the water are maintained until the end of the burner-on period when the room thermostat cuts out the burner. A high percentage of heat used during the initial heating period is not used to heat the water.

Home hot-water heating systems are designed and sized to provide adequate heating for the buildings in which they are installed when the outside temperatures are a number of degrees below zero. As a consequence, when the outside temperature is higher than the lowest designed for, the amount of heat contained in the water at the start of circulation is more than that transferred to the indoor air during circulation. The water, therefore, returns to the inlet of the boiler still containing some of the heat it started out with. This does not promote optimum heat transfer. During the burner-on period there can be several circulations like this; the negative effect on heat transfer being cumulative.

The great majority of home hot-water heating systems already in the marketplace suffer from both heat exchange and heat transfer inefficiencies. Thus, an opportunity for efficiency improvements can be attained by addressing these two areas of inefficiency, resulting in energy savings and pollution reduction from reduced burner operation.

BACKGROUND ART

It is well known that several items of prior art use timer circuits to control periods of burner and blower operation in forced air heating systems in order to effect energy savings. In each item of prior art, the timer circuits have been used uniquely to achieve savings in a different way to the other items of prior art. The prior art does not teach repeated burner-on cycles within the heating cycle in order to increase heat transfer efficiency as in the present invention.

An example of prior art using a timer to control for an air conditioner or furnace is U.S. Pat. No. 4,136,730 (the '730 patent). The '730 patent teaches use of a blower timer to cause the blower to continue operation for 10 to 15 minutes after the compressor or burner is shut off to recover heat from a furnace cooling down after being turned off. The '730 patent discloses a timer but not a second thermostat as in the present invention and involves efficiency increases by limiting the operating cycle by a period of time. The '730 patent does not teach repeated burner-on cycles within the heating cycle in order to increase heat transfer efficiency as in the present invention.

Others have suggested adaptive alterations to the heating cycle again occurring at the end of the heating cycle. An example of this prior art is U.S. Pat. No. 4,408,711 (the '711 Patent) for an electronic thermostat operative to be connected to a furnace to control its state of operation. When the ambient temperature falls below the set point, the furnace is energized for a predetermined period of time. The period is increased or decreased by a small increment after each heating cycle depending upon magnitude of the temperature increase which occurred at the thermostat as a result of the heating cycle. This increase or decrease adaptively achieves a predetermined temperature change during the heating cycle that minimizes the temperature overshoot which occurs following de-energization of the furnace. Thus, the '711 Patent seeks to automatically arrive at a shortened period of operation of the furnace to utilize standing losses.

The present invention is different in that it utilizes a second thermostat and a timer. The timer enables potentially repeated cycling of the furnace in each heat cycle and the second thermostat restricts the potentially repeated cycling to within a range defined above the room thermostat's lower temperature limit and below the room thermostat's upper temperature limit. In very low outside temperatures, the override thermostat also ensures that the heating system maintains a comfortable indoor temperature. Neither the components nor their functions are taught by '711 Patent.

SUMMARY OF INVENTION

An electronic circuit conserves fuel consumption and reduces carbon dioxide emissions in a water-based heating system. Such a heating system comprises a burner that heats water and a room thermostat. The room thermostat comprises a setting for a lower temperature limit and an upper temperature limit and is operable to activate the burner upon detecting a room temperature at or below the lower temperature limit and deactivate the burner upon detecting a room temperature at or above the upper temperature limit. The electronic circuit comprises an override thermostat which has a setting for a lower temperature limit and an upper temperature limit below those of the room thermostat. The override thermostat is operable to activate continuous operation of the burner when the indoor temperature falls below the lower temperature limit of the override thermostat and until the upper temperature limit of the override thermostat is reached. The electronic circuit further comprises a timer operable to deactivate and reactivate the burner while the room thermostat is calling for heat.

Technical Problem

Excess operating costs in a home heating system and unnecessary air pollution are attributable to heat exchange inefficiency between the burner and circulating water due to standing losses, and to heat transfer inefficiency between circulating water and indoor air.

Heat transfer between circulating water and indoor air is more efficient if all of the heat absorbed by the water when it leaves the boiler is transferred to the indoor air before the water is returned to be reheated by the boiler.

However, with most central heating systems, the water returns to the boiler for reheating still containing a substantial amount of heat, which has the effect of raising the boiler inlet water temperature but reducing heat transfer efficiency. Improved heat transfer efficiency will be achieved if the water is recirculated a second or even third time without adding more heat.

Current technology attempts to increase efficiency in fuel combustion by fitting furnaces with induced draft fans designed to increase the influx of oxygen. Such an approach can be somewhat counterproductive because it increases the velocity of gases leaving the furnace. This reduces the dwell time of these gases in the vicinity of the heat exchanger, which reduces the efficiency of heat exchange. Additionally, the higher the emission velocity of gas from the burner the lower the heat absorbed by the heat exchanger with consequent loss of useful heat.

Solution to Problem

During the continuous burner-on period of the standard heating cycle, heat is used to build up and maintain the temperature of the heat exchanger body. This heat which would otherwise be lost via the chimney can be reclaimed and conserved by having one or more shorter burner-on periods within the heating cycle. Each time the burner goes off, the circulating water pump continues running. It is important that the pump operate in the normal fashion while the room thermostat is calling for heat because the water continues to absorb the residual heat in the heat exchanger as well as the heat in the surrounding hot gases and to pass it on to the indoor air. During these burner-off periods the exit velocity of the hot gases and the rate of heat emission from the heat exchanger are reduced by virtue of the burner being off and the natural or induced draft being reduced. Also the cooling effect of the incoming air to support combustion is much less.

Advantageous Effects of Invention

A significant benefit of the invention is achieved when it is applied to existing heating systems already in the marketplace. This is where huge savings can be made in fuel usage and reductions in carbon dioxide emissions worldwide.

In a series of tests simulating the presence of the invention in heating systems, the results showed reduced fuel consumption and carbon dioxide emissions in a range of 37 to 50 percent. With the boiler that had a complete heating cycle of burner-on time of 12 minutes and burner-off time of 12 minutes, under identical conditions, inclusion of the invention consistently produced cycles of burner-on times of 6 minutes and burner-off times of 18 minutes.

Thus, the invention achieves substantial improvements in efficiency, energy use and pollution of the environment by reducing burner operation. The invention also reduces excess water-heating system costs, thus reducing consumer fuel bills. The invention also minimizes consumer inconvenience when introduced to a heating system that otherwise would continue to send heat to a room after the desired room temperature setting has been achieved.

DESCRIPTION OF EMBODIMENTS

Figure 1:
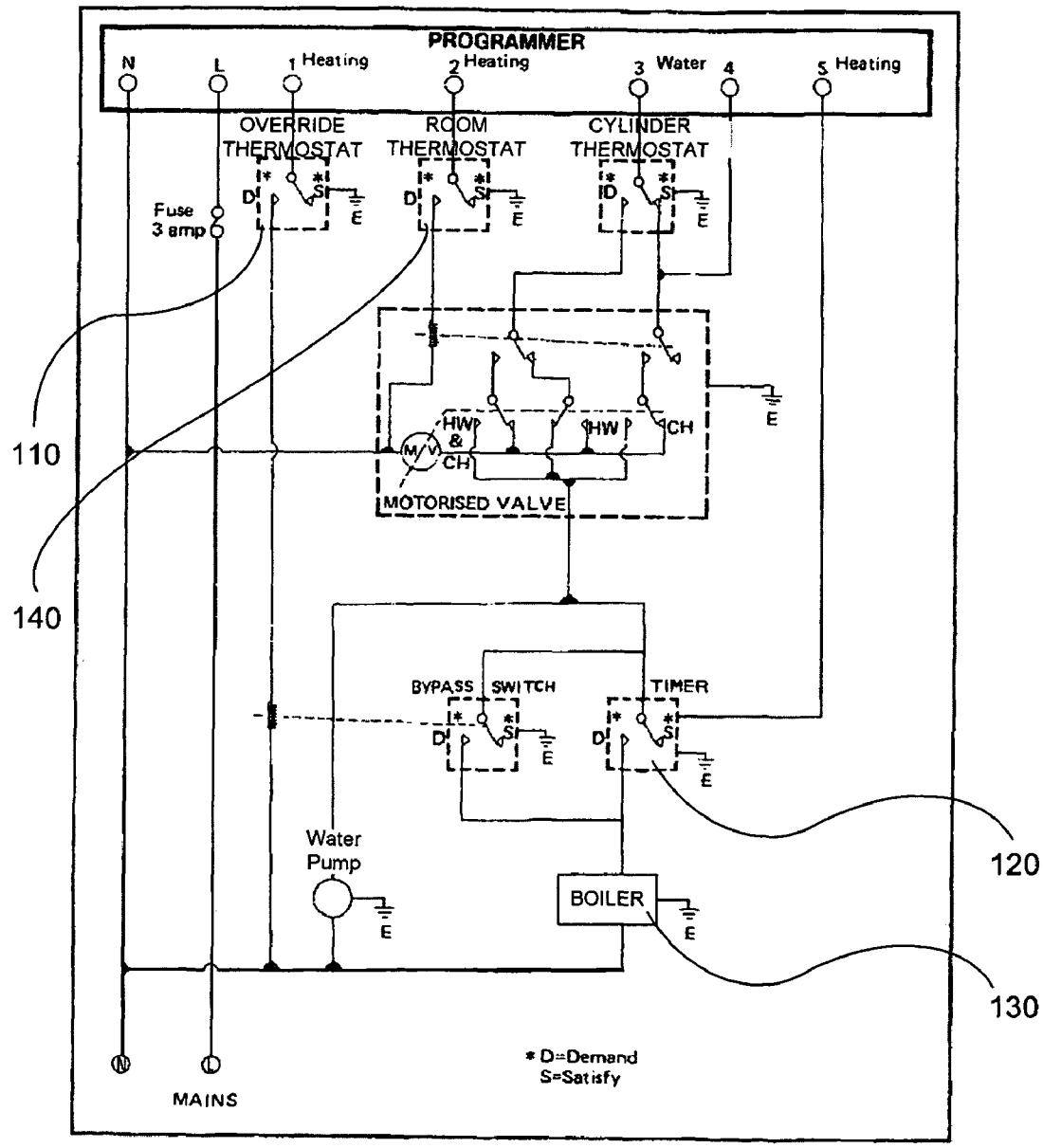
FIG. 1 is a schematic of electric circuitry typically operable in a water-heating system and showing the added circuitry of the invention.

In the following description, reference is made to the accompanying drawing, which forms a part hereof and which illustrates a preferred embodiment of the present invention. The drawing and the preferred embodiment of the invention is presented with the understanding that the present invention is susceptible of embodiments in many different forms and, therefore, other embodiments may be utilized and structural, and operational changes may be made, without departing from the scope of the present invention.

FIG. 1 is an exemplary schematic of electric circuitry typically operable in a water-heating system integrated with the added electronic circuit of the invention. The purpose of the added electronic circuit is to conserve fuel consumption and reduce carbon dioxide emissions in a heating system that comprises a boiler (130) that heats water, and a room thermostat (140). A water pump present in all such systems delivers hot water for heating. The room thermostat (140), as is common in such applications, comprises a setting for a lower temperature limit and an upper temperature limit and is operable to call for heat and thus activate the boiler (130) upon detecting a room temperature at or below the lower temperature limit and deactivate the burner upon detecting a room temperature at or above the upper temperature limit.

The added electronic circuit comprises an override thermostat (110) and a timer (120).

The override thermostat (110) is similar to the room thermostat (140) in that it comprises a setting for a lower temperature limit and an upper temperature limit. The lower temperature limit and an upper temperature limit of the override thermostat (110) are set below their respective settings on the room thermostat (140).

An important operability of the override thermostat (110) occurs when the indoor temperature falls below the lower temperature limit of the room thermostat (140). In that circumstance, the override thermostat (110) is operable to activate continuous operation of the boiler (130) until the upper temperature limit of the override thermostat (110) is reached. The upper temperature limit of the override thermostat (110) would optimally be set a few degrees below the upper temperature limit of the room thermostat (140) so that the residual energy in the water and heat exchanger would raise be used to raise the room temperature to the upper temperature limit set on the room thermostat (140).

Once the upper temperature limit of the override thermostat (110) is reached, with the room thermostat (140) still calling for heat, the timer (120) again takes over control of the boiler (130) "on" and "off" periods. Once the upper limit on the override thermostat (110) has been reached, the timer by-pass switch opens thus allowing the timer (120) to dictate when the boiler (130) is on and off. The upper temperature limit set on the override thermostat (110) is deliberately set below that of the room thermostat (140) so that when the upper temperature limit set on the override thermostat (110) is reached the room thermostat (140) is still calling for heat. The room thermostat (140) circuit, which incorporates the timer (120), the boiler (130) and the pump, then takes over control and the invention comes back into play. In the preferred embodiment, it is not possible for the boiler (130) to fire if the room thermostat (140) is not calling for heat since the room thermostat (140) cuts off the power supply to both the boiler (130) and the timer (120). Preferably, the timer (120) operates using a switch on the electrical supply to the boiler (130) located downstream of a room thermostat (140) switch. Thus the timer (120) will still go through its paces but will have no effect on boiler (130) operation until the room thermostat (140) restores electricity to the timer (120).

In normal operation in very cold weather, the override thermostat (110) comes on because the indoor temperature has fallen below the cut-in point, which is the lower temperature limit of the room thermostat (140). This means that the boiler (130) on-periods controlled by the timer (120) are not sufficient to provide enough heat to cope with severe outside conditions. When the lower temperature limit of the override thermostat (110) is reached, a timer (120) by-pass switch closes and takes the timer out of circuit. This means that as long as the override thermostat (110) is active, the boiler (130) is on continuously. At this point, the room thermostat (140) is still calling for heat. The indoor temperature will quickly rise to the upper temperature limit of the override thermostat (110) when the timer (120) by-pass switch will open and bring the timer (120) back into circuit. Because the upper temperature limit on the room thermostat (140) is set above that of the override thermostat (110), the room thermostat (140) is still calling for heat. Hence the timer (120) once again dictates the boiler (130) on-period and boiler (130) off-period.

The timer (120) is operable to deactivate and reactivate the burner while the room thermostat (140) is calling for heat. The room thermostat (140) is calling for heat when it detects a room temperature below its lower temperature limit. Effectively, the timer (120) predetermines the "off" and "on" periods of the boiler (130) within the standard cycle dictated by the room thermostat (140). Thus, in preferred embodiments, the timer (120) alternately interrupts and reinstates the electrical supply to a chosen circuit, for example to a circuit controlling the burner, or to a chosen device, such as the boiler (130). For a preferred embodiment, the timer (120) operates on the electrical supply to the boiler (130). The timer (120) preferably has a wide range of "on" and "off" period settings from a few seconds to many hours.

Thus, in preferred embodiments, the burner cannot operate if the room thermostat (140) is not calling for heat; the override thermostat (110) can only operate when the room thermostat (140) is calling for heat; and, the override thermostat (110) cannot cause the burner to fire independently of the room thermostat (140).

The added circuit of the invention delivers operational benefits. With the boiler (130) deactivated, that is the burner is off and not firing, the influx of relatively cold combustion air is reduced to a minimum, especially if the boiler (130) has an induced draught fan. As a consequence, the rate of cooling of the heat exchanger is also reduced, providing more residual heat in the heat exchanger available to heat water circulated by the water pump. Additionally, with both the boiler (130) and the induced draught fan deactivated, the exit velocity of hot gases is less, increasing the dwell time and again slowing down the dissipation of heat from the heat exchanger and providing more heat for transfer to circulating water.

Since the timer (120) will activate the boiler (130) or its circuit only when the room thermostat (140) is calling for heat, the boiler (130) will not be activated if heat is not being called for by the room thermostat (140). This operational limitation prevents unnecessary operation of the burner, wasted heat, unnecessary fuel consumption and generation of combustion pollution when heat is not being called for by the room thermostat (140).

The burner "on" and "off" periods provided by the timer can occur several times during what otherwise would have been a single heating cycle operated by a single room thermostat (110). Operation of the water pump is unaffected by the invention and it runs continuously while the room thermostat (110) is calling for heat. Thus, the benefits are twofold as has been shown in practice: heat is reclaimed, which would otherwise be lost; and the overall burner-off time is greater. Fuel is therefore conserved and air pollution reduced.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the heating system industry.

What is claimed is:

1. An electronic circuit to conserve fuel consumption and reduce carbon dioxide emissions in a heating system that comprises a burner that heats water; and, a room thermostat comprising a setting for a lower temperature limit and an upper temperature limit wherein the room thermostat is operable to activate the burner upon detecting a room temperature at or below the lower temperature limit and deactivate the burner upon detecting a room temperature at or above the upper temperature limit, the electronic circuit comprising:

an override thermostat comprising a setting for a lower temperature limit and an upper temperature limit below those of the room thermostat and operable to activate continuous operation of the burner when the indoor temperature falls below the lower temperature limit of the override thermostat and until the upper temperature limit of the override thermostat is reached; and, a timer operable to deactivate and reactivate the burner while the room thermostat is calling for heat.

2. The electronic circuit of claim 1 wherein the timer is operable to deactivate and reactivate the burner by interrupting and restoring electrical supply to the burner.

3. The electronic circuit of claim 1 wherein the timer is operable to deactivate and reactivate the burner by interrupting and restoring electrical supply to a circuit controlling the burner.

* * * * *